US008116500B2

(12) United States Patent
Oxford et al.

(10) Patent No.: US 8,116,500 B2
(45) Date of Patent: Feb. 14, 2012

(54) MICROPHONE ORIENTATION AND SIZE IN A SPEAKERPHONE

(75) Inventors: William V. Oxford, Austin, TX (US); Kevin Patrick Kellar, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 1454 days.

(21) Appl. No.: 11/405,690

(22) Filed: Apr. 17, 2006

(65) Prior Publication Data

US 2006/0239477 A1 Oct. 26, 2006

Related U.S. Application Data

(63) Continuation-in-part of application No. 11/251,084, filed on Oct. 14, 2005, now Pat. No. 7,720,232.

(60) Provisional application No. 60/676,415, filed on Apr. 29, 2005, provisional application No. 60/634,315, filed on Dec. 8, 2004, provisional application No. 60/619,303, filed on Oct. 15, 2004.

(51) Int. Cl.
*H04R 9/08* (2006.01)
*H04M 1/00* (2006.01)

(52) U.S. Cl. ........ 381/361; 381/150; 381/355; 381/122; 381/87; 381/91; 379/388.01; 379/388.02; 379/420.01; 379/428.01

(58) Field of Classification Search .................. 381/150, 381/361, 355, 122, 87, 91; 379/388.01, 388.02, 379/420.01, 428.01
See application file for complete search history.

(56) References Cited

U.S. PATENT DOCUMENTS

| | | | |
|---|---|---|---|
| 3,963,868 | A | 6/1976 | Randmere et al. |
| 4,903,247 | A | 2/1990 | Van Gerwen et al. |
| 5,029,162 | A | 7/1991 | Epps |
| 5,034,947 | A | 7/1991 | Epps |
| 5,051,799 | A | 9/1991 | Paul et al. |
| 5,054,021 | A | 10/1991 | Epps |
| 5,121,426 | A | 6/1992 | Baumhauer, Jr. et al. |

(Continued)

FOREIGN PATENT DOCUMENTS

JP 62203432 9/1987

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner* — Vivian Chin
*Assistant Examiner* — Paul Kim
(74) *Attorney, Agent, or Firm* — Meyertons Hood Kivlin Kowert & Goetzel, P.C.; Jeffrey C. Hood

(57) ABSTRACT

In various embodiments, a speakerphone may comprise multiple (e.g., 16) microphones placed in a circular array around a central speaker. The microphones may be mounted vertically in the speakerphone with their respective diaphragms substantially parallel to the top surface of the speakerphone. The centrally mounted speaker may be coupled to a stiff internal speaker enclosure. The speaker enclosure may be made of a stiff, heavy material (e.g., a dense plastic) to prevent the speaker vibrations from excessively vibrating the speakerphone enclosure (which may affect the microphones). The speaker enclosure may also include a raised rim and ridges to increase its stiffness.

17 Claims, 13 Drawing Sheets

U.S. PATENT DOCUMENTS

| | | | |
|---|---|---|---|
| 5,168,525 | A | 12/1992 | Muller |
| 5,263,019 | A | 11/1993 | Chu |
| 5,305,307 | A | 4/1994 | Chu |
| 5,365,583 | A | 11/1994 | Huang et al. |
| 5,390,244 | A | 2/1995 | Hinman et al. |
| 5,396,554 | A | 3/1995 | Hirano et al. |
| 5,550,924 | A | 8/1996 | Helf et al. |
| 5,566,167 | A | 10/1996 | Duttweiler |
| 5,581,620 | A | 12/1996 | Brandstein et al. |
| 5,606,642 | A | 2/1997 | Stautner et al. |
| 5,617,539 | A | 4/1997 | Ludwig et al. |
| 5,649,055 | A | 7/1997 | Gupta et al. |
| 5,657,393 | A | 8/1997 | Crow |
| 5,664,021 | A | 9/1997 | Chu et al. |
| 5,689,641 | A | 11/1997 | Ludwig et al. |
| 5,715,319 | A | 2/1998 | Chu |
| 5,737,431 | A | 4/1998 | Brandstein et al. |
| 5,751,338 | A | 5/1998 | Ludwig, Jr. |
| 5,778,082 | A | 7/1998 | Chu et al. |
| 5,787,183 | A | 7/1998 | Chu et al. |
| 5,844,994 | A | 12/1998 | Graumann |
| 5,896,461 | A | 4/1999 | Faraci et al. |
| 5,912,967 | A * | 6/1999 | Gaffney et al. .......... 379/420.02 |
| 5,924,064 | A | 7/1999 | Helf |
| 5,983,192 | A | 11/1999 | Botzko et al. |
| 6,072,522 | A | 6/2000 | Ippolito et al. |
| 6,130,949 | A | 10/2000 | Aoki et al. |
| 6,141,597 | A | 10/2000 | Botzko et al. |
| 6,173,059 | B1 | 1/2001 | Huang et al. |
| 6,243,129 | B1 | 6/2001 | Deierling |
| 6,246,345 | B1 | 6/2001 | Davidson et al. |
| 6,351,238 | B1 | 2/2002 | Kishigami et al. |
| 6,351,731 | B1 | 2/2002 | Anderson et al. |
| 6,363,338 | B1 | 3/2002 | Ubale et al. |
| 6,453,285 | B1 | 9/2002 | Anderson et al. |
| 6,459,942 | B1 | 10/2002 | Markow et al. |
| 6,498,859 | B2 | 12/2002 | Kuerti et al. |
| 6,535,604 | B1 | 3/2003 | Provencal et al. |
| 6,535,610 | B1 | 3/2003 | Stewart |
| 6,566,960 | B1 | 5/2003 | Carver |
| 6,587,823 | B1 | 7/2003 | Kang et al. |
| 6,590,604 | B1 | 7/2003 | Tucker et al. |
| 6,593,956 | B1 | 7/2003 | Potts et al. |
| 6,594,688 | B2 | 7/2003 | Ludwig et al. |
| 6,615,236 | B2 | 9/2003 | Donovan et al. |
| 6,625,271 | B1 | 9/2003 | O'Malley et al. |
| 6,646,997 | B1 | 11/2003 | Baxley et al. |
| 6,657,975 | B1 | 12/2003 | Baxley et al. |
| 6,697,476 | B1 | 2/2004 | O'Malley et al. |
| 6,721,411 | B2 | 4/2004 | O'Malley et al. |
| 6,731,334 | B1 | 5/2004 | Maeng et al. |
| 6,744,887 | B1 | 6/2004 | Berstein et al. |
| 6,760,415 | B2 | 7/2004 | Beecroft |
| 6,816,904 | B1 | 11/2004 | Ludwig et al. |
| 6,822,507 | B2 | 11/2004 | Buchele |
| 6,831,675 | B2 | 12/2004 | Shachar et al. |
| 6,850,265 | B1 | 2/2005 | Strubbe et al. |
| 6,856,689 | B2 | 2/2005 | Sudo et al. |
| 6,912,178 | B2 | 6/2005 | Chu et al. |
| 6,922,206 | B2 | 7/2005 | Chu et al. |
| 6,980,485 | B2 | 12/2005 | McCaskill |
| 7,012,630 | B2 | 3/2006 | Curry et al. |
| 7,054,820 | B2 | 5/2006 | Potekhin et al. |
| 7,130,428 | B2 | 10/2006 | Hirai et al. |
| 7,133,062 | B2 | 11/2006 | Castles et al. |
| 7,182,324 | B2 | 2/2007 | Baumhauer, Jr. et al. |
| 7,315,619 | B2 | 1/2008 | Marton et al. |
| 7,477,735 | B2 | 1/2009 | Marton et al. |
| 7,593,539 | B2 | 9/2009 | Oxford |
| 2002/0123895 | A1 | 9/2002 | Potekhin et al. |
| 2002/0168079 | A1 | 11/2002 | Kuerti et al. |
| 2003/0197316 | A1 | 10/2003 | Baumhauer, Jr. et al. |
| 2004/0001137 | A1 | 1/2004 | Cutler et al. |
| 2004/0010549 | A1 | 1/2004 | Matus et al. |
| 2004/0032487 | A1 | 2/2004 | Chu et al. |
| 2004/0032796 | A1 | 2/2004 | Chu et al. |
| 2004/0183897 | A1 | 9/2004 | Kenoyer et al. |
| 2005/0084126 | A1 * | 4/2005 | Milton .......................... 381/336 |
| 2005/0157866 | A1 | 7/2005 | Marton et al. |
| 2005/0169459 | A1 | 8/2005 | Marton et al. |
| 2005/0212908 | A1 | 9/2005 | Rodman et al. |
| 2005/0213745 | A1 * | 9/2005 | Thomasson .............. 379/388.01 |
| 2005/0262201 | A1 | 11/2005 | Rudolph et al. |
| 2006/0013416 | A1 | 1/2006 | Truong et al. |
| 2006/0034469 | A1 | 2/2006 | Tamiya et al. |
| 2006/0109998 | A1 | 5/2006 | Michel |
| 2006/0165242 | A1 | 7/2006 | Miki et al. |
| 2010/0008529 | A1 | 1/2010 | Oxford |

FOREIGN PATENT DOCUMENTS

| | | |
|---|---|---|
| JP | 07264102 | 3/1994 |
| JP | 07135478 | 5/1995 |
| JP | 07240722 | 9/1995 |
| JP | 09307651 | 11/1997 |
| JP | 10190848 | 7/1998 |
| WO | WO98/15945 | 4/1998 |
| WO | 9922460 | 5/1999 |
| WO | 05064908 | 7/2005 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System", Multimedia '02; Dec. 2002; 10 pages; Microsoft Research; Redmond, WA.

P. H. Down; "Introduction to Videoconferencing"; http://www.video.ja.net/intro/; 2001; 26 pages.

"Polycom Executive Collection"; Jun. 2003; 4 pages; Polycom, Inc.; Pleasanton, CA.

"MacSpeech Certifies Voice Tracker™ Array Microphone"; Apr. 20, 2005; 2 pages; MacSpeech Press.

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages.

M. Berger and F. Grenez; "Performance Comparison of Adaptive Algorithms for Acoustic Echo Cancellation"; European Signal Processing Conference, Signal Processing V: Theories and Applications, 1990; pp. 2003-2006.

C.L. Dolph; "A current distribution for broadside arrays which optimizes the relationship between beam width and side lobe level". Proceedings of the I.R.E. and Wave and Electrons; Jun. 1946; pp. 335-348; vol. 34.

M. Mohan Sondhi, Dennis R. Morgan and Joseph L. Hall; "Stereophonic Acoustic Echo Cancellation—An Overview of the Fundamental Problem"; IEEE Signal Processing Letters; Aug. 1995; pp. 148-151; vol. 2, No. 8.

Rudi Frenzel and Marcus E. Hennecke; "Using Prewhitening and Stepsize Control to Improve the Performance of the LMS Algorithm for Acoustic Echo Compensation"; IEEE International Symposium on Circuits and Systems; 1992; pp. 1930-1932.

Steven L. Gay and Richard J. Mammone; "Fast converging subband acoustic echo cancellation using RAP on the WE DSP16A"; International Conference on Acoustics, Speech, and Signal Processing; Apr. 1990; pp. 1141-1144.

Andre Gilloire and Martin Vetterli; "Adaptive Filtering in Subbands with Critical Sampling: Analysis, Experiments, and Application to Acoustic Echo Cancellation"; IEEE Transactions on Signal Processing, Aug. 1992; pp. 1862-1875; vol. 40, No. 8.

Andre Gilloire; "Experiments with Sub-band Acoustic Echo Cancellers for Teleconferencing"; IEEE International Conference on Acoustics, Speech, and Signal Processing; Apr. 1987; pp. 2141-2144; vol. 12.

Henry Cox, Robert M. Zeskind and Theo Kooij; "Practical Supergain", IEEE Transactions on Acoustics, Speech, and Signal Processing; Jun. 1986; pp. 393-398.

Walter Kellermann; "Analysis and design of multirate systems for cancellation of acoustical echoes"; International Conference on Acoustics, Speech, and Signal Processing, 1988 pp. 2570-2573; vol. 5.
Lloyd Griffiths and Charles W. Jim; "An Alternative Approach to Linearly Constrained Adaptive Beamforming"; IEEE Transactions on Antennas and Propagation; Jan. 1982; pp. 27-34; vol. AP-30, No. 1.
B. K. Lau and Y. H. Leung; "A Dolph-Chebyshev Approach to the Synthesis of Array Patterns for Uniform Circular Arrays" International Symposium on Circuits and Systems; May 2000; 124-127; vol. 1.
C. M. Tan, P. Fletcher, M. A. Beach, A. R. Nix, M. Landmann and R. S. Thoma; "On the Application of Circular Arrays in Direction Finding Part I: Investigation into the estimation algorithms", 1st Annual COST 273 Workshop, May/Jun. 2002; 8 pages.
Ivan Tashev; Microsoft Array project in MSR: approach and results, http://research.microsoft.com/users/ivantash/Documents/MicArraysInMSR.pdf; Jun. 2004; 49 pages.
Hiroshi Yasukawa, Isao Furukawa and Yasuzou Ishiyama; "Acoustic Echo Control for High Quality Audio Teleconferencing"; International Conference on Acoustics, Speech, and Signal Processing; May 1989; pp. 2041-2044; vol. 3.
Hiroshi Yasukawa and Shoji Shimada; "An Acoustic Echo Canceller Using Subband Sampling and Decorrelation Methods"; IEEE Transactions on Signal Processing; Feb. 1993; pp. 926-930; vol. 41, Issue 2.
"Press Releases"; Retrieved from the Internet: http://www.acousticmagic.com/press/; Mar. 14, 2003-Jun. 12, 2006; 18 pages; Acoustic Magic.
Marc Gayer, Markus Lohwasser and Manfred Lutzky; "Implementing MPEG Advanced Audio Coding and Layer-3 encoders on 32-bit and 16-bit fixed-point processors"; Jun. 25, 2004; 7 pages; Revision 1.11; Fraunhofer Institute for Integrated Circuits IIS; Erlangen, Germany.
Man Mohan Sondhi and Dennis R. Morgan; "Acoustic Echo Cancellation for Stereophonic Teleconferencing"; May 9, 1991; 2 pages; AT&T Bell Laboratories, Murray Hill, NJ.
Rui, et al., "Sound Source Localization for Circular Arrays of Directional Microphones", IEEE International Conference on Acoustics, Speech, and Signal Processing 2005, Mar. 18-23, 2005, vol. 3, pp. iii/93-iii/96.
Ajdler, et al., "Plenacoustic Function on the Circle with Application to HRTF Interpolation", IEEE International Conference on Acoustics, Speech, and Signal Processing 2005, Mar. 18-23, 2005, vol. 3, pp. iii/273-iii/276.
Chan, et al., "Theory and Design of Uniform Concentric Circular Arrays with Frequency Invariant Characteristics", IEEE International Conference on Acoustics, Speech, and Signal Processing 2005, Mar. 18-23, 2005, vol. 4, Philadelphia, PA, pp. iv/805-iv/808.
Tashev, et al., "A New Beamformer Design Algorithm for Microphone Arrays", IEEE International Conference on Acoustics, Speech, and Signal Processing 2005, Mar. 18-23, 2005, vol. 3, Philadelphia, PA, pp. iii/101-iii/104.
Sawada, et al., "Blind Extraction of a Dominant Source Signal from Mixtures of Many Sources", IEEE International Conference on Acoustics, Speech, and Signal Processing 2005, Mar. 18-23, 2005, vol. 3, Philadelphia, PA, pp. iii/61-iii/64.
Yan, et al., "Design of FIR Beamformer with Frequency Invariant Patterns via Jointly Optimizing Spatial and Frequency Responses", IEEE International Conference on Acoustics, Speech, and Signal Processing 2005, Mar. 18-23, 2005, vol. 4, Philadelphia, PA, pp. iv/789-iv/792.

* cited by examiner

MICROPHONE ORIENTATION AND SIZE IN A SPEAKERPHONE

PRIORITY CLAIM

This application is a continuation in part of U.S. patent application Ser. No. 11/251,084 titled "Speakerphone", which was filed Oct. 14, 2005, whose inventors are William V. Oxford (which claims benefit of priority to provisional application Ser. No. 60/619,303 titled "Speakerphone," filed on Oct. 15, 2004 whose inventors are William V. Oxford, Michael L. Kenoyer, and Simon Dudley and which claims benefit of priority to provisional application Serial No. 60/634,315 titled "Speakerphone," filed on Dec. 8, 2004 whose inventors are William V. Oxford, Michael L. Kenoyer, and Simon Dudley) which is hereby incorporated by reference in its entirety as though fully and completely set forth herein.

This application further claims priority to U.S. Provisional Patent Application Ser. No. 60/676,415 titled "Speakerphone Functionality", which was filed Apr. 29, 2005, whose inventors are William V. Oxford, Vijay Varadarajan and Ioannis S. Dedes which is hereby incorporated by reference in its entirety as though fully and completely set forth herein.

BACKGROUND OF THE INVENTION

1. Field of the Invention

The present invention relates generally to speakerphones and, more specifically to microphone and speaker configurations in a speakerphone.

2. Description of the Related Art

Microphones in speakerphones may face several audio challenges. For example, sound from a speaker on the speakerphone may interfere with the audio the microphones are receiving. In addition, vibrations from the table the speakerphone is sitting on may also interfere with the microphones. Some speakerphones use outward facing directional microphones with a cardiod response (null facing an audio speaker on the speakerphone). This orientation leads to phase problems with incoming sound waves. For example, as sound waves proceed over the phone, a phase shift may occur at the edge of the speakerphone.

SUMMARY OF THE INVENTION

In various embodiments, a speakerphone may comprise multiple (e.g., 16) microphones vertically mounted in a circular array around a central speaker. Each microphone may be mounted to the speakerphone through a microphone support. The microphone support may be made of a flexible material and have various features designed to minimize interference to the microphone (e.g., from the speaker and/or vibrations external to the speakerphone). The microphones may be mounted vertically in the speakerphone with their respective diaphragms substantially parallel to the top surface of the speakerphone.

In some embodiments, the centrally mounted speaker may be coupled to a stiff internal speaker enclosure. The speaker enclosure may be made of a stiff, heavy material (e.g., a dense plastic) to prevent the speaker vibrations from excessively vibrating the speakerphone enclosure (which may affect the microphones). The speaker enclosure may include a raised rim and include internal and external ridges for increased stiffness.

BRIEF DESCRIPTION OF THE DRAWINGS

A better understanding of the present invention may be obtained when the following detailed description is considered in conjunction with the following drawings, in which.

Figure 1:
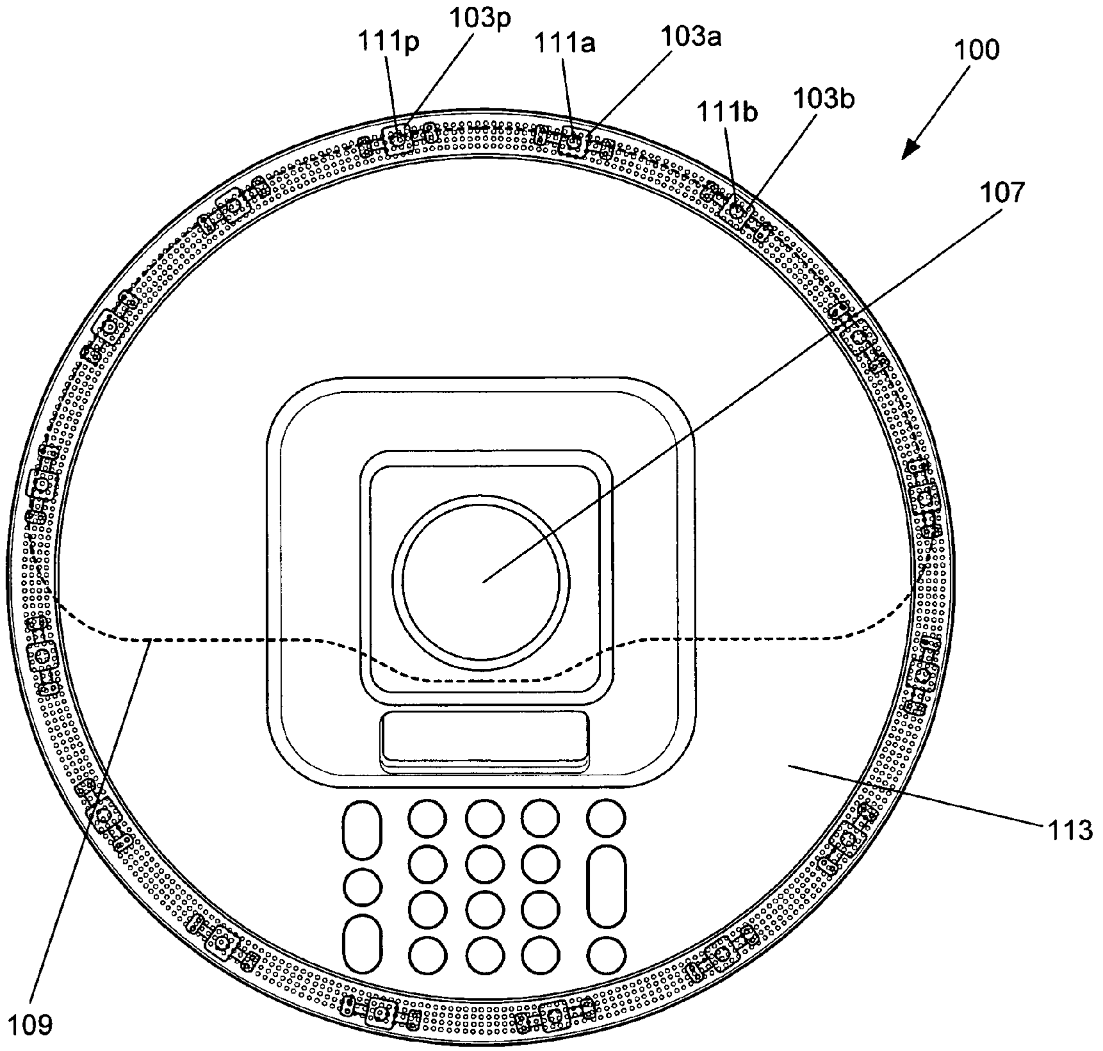
FIG. 1 illustrates an embodiment of microphone placements for a speakerphone, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "High Definition Camera Pan Tilt Mechanism", Ser. No. 11/251,083, which was filed Oct. 14, 2005, whose inventors are Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

FIG. 1 illustrates an embodiment of microphone placements for a speakerphone 100, according to an embodiment. A plurality of microphone supports 103*a-p* may be arranged in a circle around a central speaker 107. The central speaker 107 may be set in a speaker enclosure 109. The microphones 111*a-p* may be arranged in a circular configuration to make real time beamforming easier than if the microphones 111*a-p* were outward facing. However, in another embodiment, the microphones 111*a-p* may be outward facing (e.g., along a side edge of the speakerphone enclosure 113). Other array configurations are also contemplated (e.g., the microphones 111*a-p* may be arranged in a square configuration).

In some embodiments, the microphones 111*a-p* may be omni-directional pressure transducer microphones mounted vertically (i.e., with their diaphragms facing the top surface of the speakerphone 100). Other microphone types are also contemplated (e.g., directional microphones, cardioid microphones, figure-of-eight microphones, shotgun microphones, etc.) The microphones may be configured with their axis oriented vertically so that their diaphragms move principally up and down. The vertical orientation may enhance the sensitivity of the microphones over microphones mounted on their side. In some embodiments, the microphones 111*a-p* may be mounted to the top plate of the speakerphone enclosure 113 through the microphone supports 103*a-p* and may all open into the same interior speakerphone chamber. In some embodiments, the microphones 111*a-p* may be coupled to the bottom plate of the speakerphone enclosure 113. Small microphones may be used because they may be less sensitive to vibration received through the speakerphone enclosure 113 than larger microphones. In some embodiments, sixteen microphones 111*a-p* may be used. Other numbers of microphones are also contemplated (e.g., 8, 32, 128, etc.).

FIGS. 2*a-d* illustrate an embodiment of a microphone support 103 to couple a microphone to the speakerphone enclosure 113, according to an embodiment. The microphone support 103 may include a central mass 201 with a cavity 209 for mounting a microphone. The cavity 209 may include a top hole 251 a which may be smaller than a bottom hole 251*b*. The microphone may fit through bottom hole 251*b* and be restrained by the overlap in the microphone support 103 from the smaller top hole 251*a*. The microphone may have a snug fit in the cavity 209 (e.g., the sides of the microphone may have a friction fit with the sides of the cavity 209). The microphone may also be attached to the microphone support 103 through adhesive. In some embodiments, the microphone support 103 may be formed around the microphone (with the microphone inside cavity 209). Other methods of coupling the microphone to the microphone support 103 are also contemplated.

Figure 5:
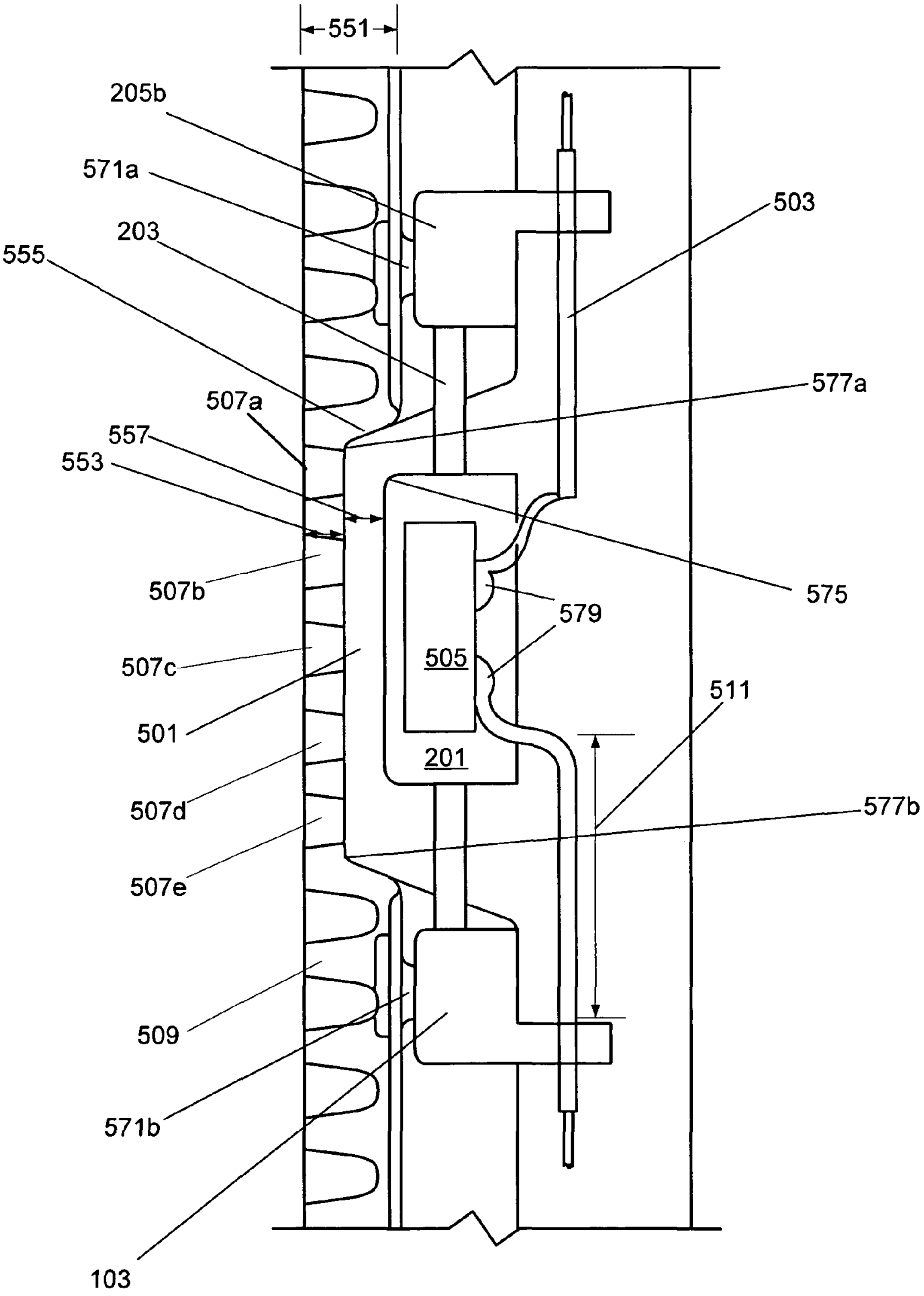
FIG. 5 illustrates a mounted microphone in a microphone support in a speakerphone enclosure.

In some embodiments, the central mass 201 may be suspended from two mounting brackets 205*a-b* by mounting strips 203*a-b*. Each mounting bracket 205*a-b* may include mounting holes 207*a-b* for inserting into posts 571*a-b* (as seen in FIG. 5) attached to the top plate of a speakerphone enclosure 113. The posts 571*a-b* may couple to the mounting holes 207*a-b* through a friction fit, adhesive, etc. In some embodiments, the microphone supports may be mounted to a base of the speakerphone (which may be made, for example, out of cast aluminum). Other materials are also contemplated. The mounting brackets 205*a-b* may include wire retaining slots 213*a-b*.

In some embodiments, the microphone supports 103 may be tuned to increase microphone isolation in important frequency ranges. The microphone supports 103*a-b* may be made of plastic. Characteristics such as Young's modulus, durometer hardness (shore hardness), and/or flexural modulus may be determined and used to pick a type of plastic (e.g., thermoplastic elastomer, thermoplastic vulcanizate (TPV), polyethylene, polypropylene, polystyrene, polyethylene terephthalate, polyamide, polyester, polyvinyl chloride, polycarbonate, acrylonitrile butadiene styrene, or polyvinylidene chloride). In some embodiments, these characteristics may be used to develop a specific formulation for a plastic. As an example, Santoprene™ TPV 111-73 with a durometer hardness of 73 (ASTM D2240) (American Society for Testing and Materials (ASTM)), specific gravity 0.97 (specific gravity 23/23° C. ASTM D792), tensile stress at 100% across flow 490 psi (pounds per square inch (psi)) (ASTM D412), tensile strength at break elastic (73° F.) across flow 1070 psi (ASTM D412), elongation at break elastic across flow 460.0% (ASTM D412), compression set 2 (ASTM D395 (158° F., 22.0 hr) 37% (176° F., 70.0 hr) 43%) may be used. Other materials and characteristics may also be used.

Figure 2A:
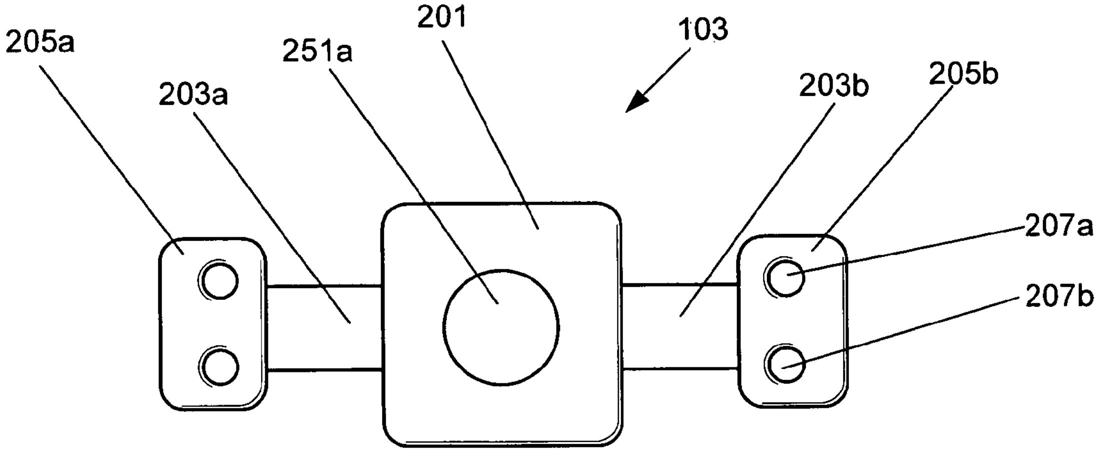
FIGS. 2*a-d* illustrate an embodiment of a microphone support, according to an embodiment.
Figure 2B:
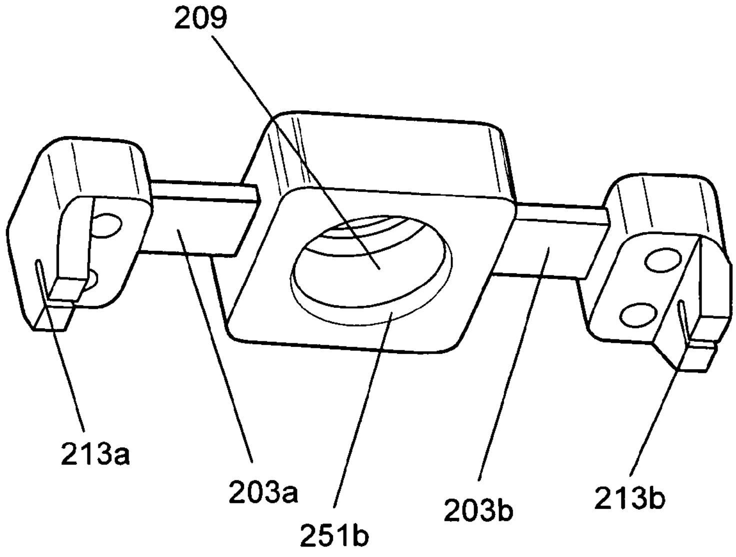
Figure 2C:
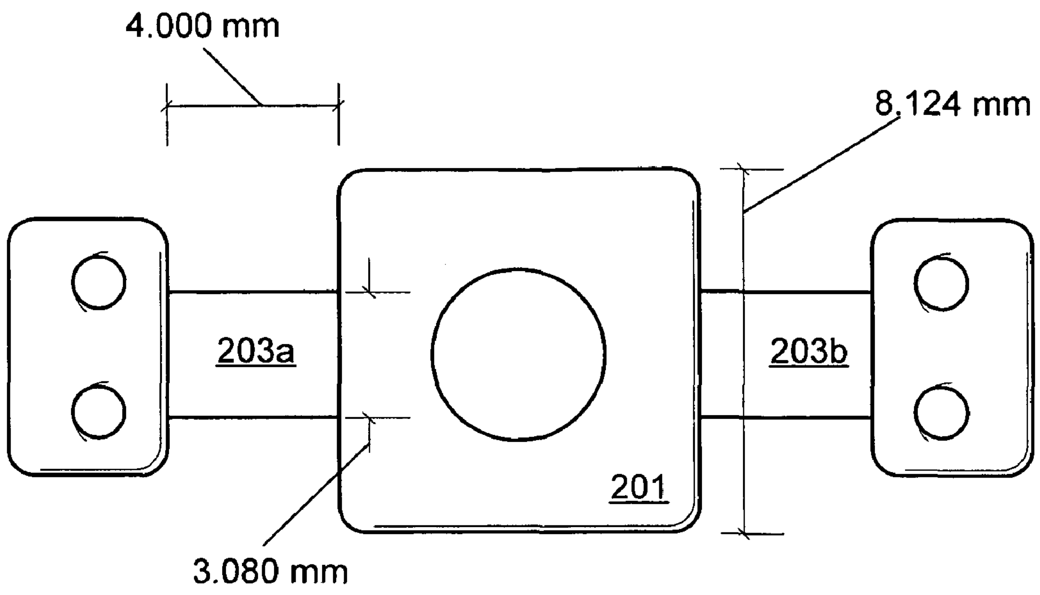
Figure 2D:
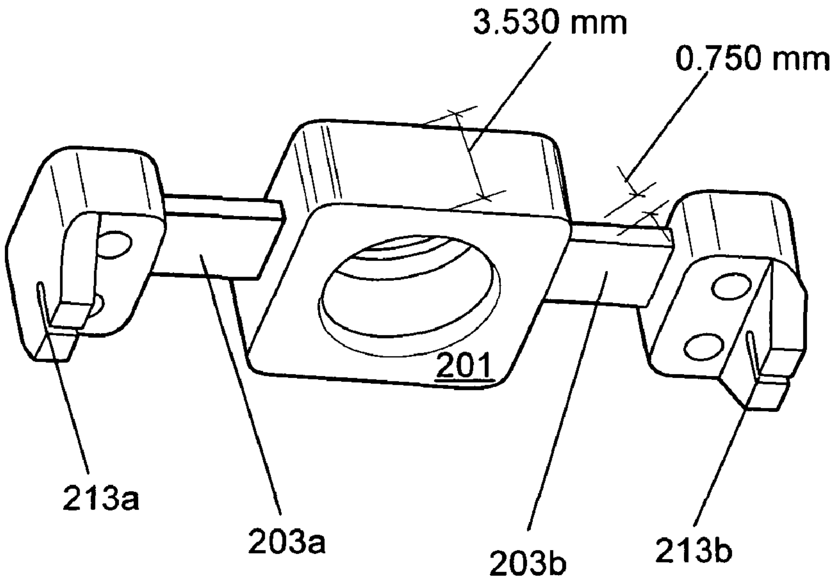

In some embodiments, the mounting brackets 205 may include two or more holes 207 for mounting the microphone support 103 to a speakerphone enclosure 100. Two holes may be used for correct alignment of the microphone 111 (along the left, right, top, and bottom). For example, with one hole on each side, the microphone support 103 may be mounted in the enclosure at an angle (or twisted). Two or more holes may allow for more consistent and straight mountings. However, in an alternate embodiment, one hole on each side of the microphone support may be used. The hole or holes 207 may also be shaped to promote correct alignment (e.g., with a figure-of-eight pattern that fits over a corresponding figure-of-eight shaped post). Other shapes are also contemplated. FIGS. 2*c-d* illustrate an embodiment of the microphone support 103 with specific dimensions. It is to be understood that the dimensions are approximate and represent one embodiment. Other embodiments may have different dimensions.

Figure 3:
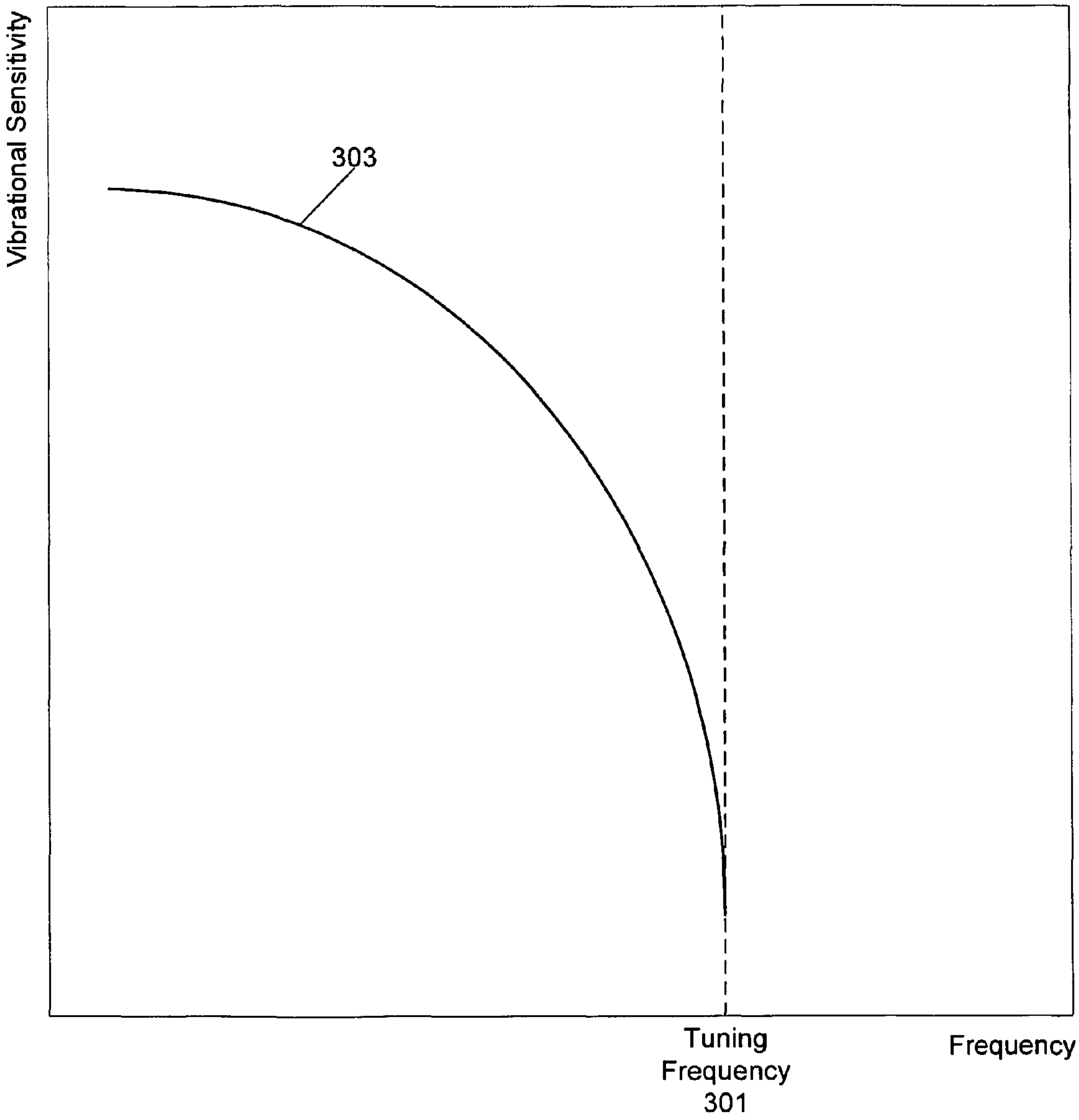
FIG. 3 illustrates a plot of microphone support vibrational sensitivity, according to an embodiment.

FIG. 3 illustrates a plot of microphone support vibrational sensitivity, according to an embodiment. A plot of vibrational sensitivity versus frequency is shown. The characteristic line 303 shows an example vibrational sensitivity versus frequency for an embodiment of the microphone support 103. The microphone support tuning cutoff frequency 301 may be affected by the design of the microphone support 103 (e.g., size and shape of its features, material type used, etc.). The support tuning cutoff frequency 301 may be the frequency at which the suspension becomes effective (e.g., frequencies above the support tuning cutoff frequency 301 may not be transferred through the microphone support 103 to the microphone.) The microphone support may be designed to minimize the support tuning cutoff frequency 301 (i.e. lower the cutoff frequency).

Figure 4:
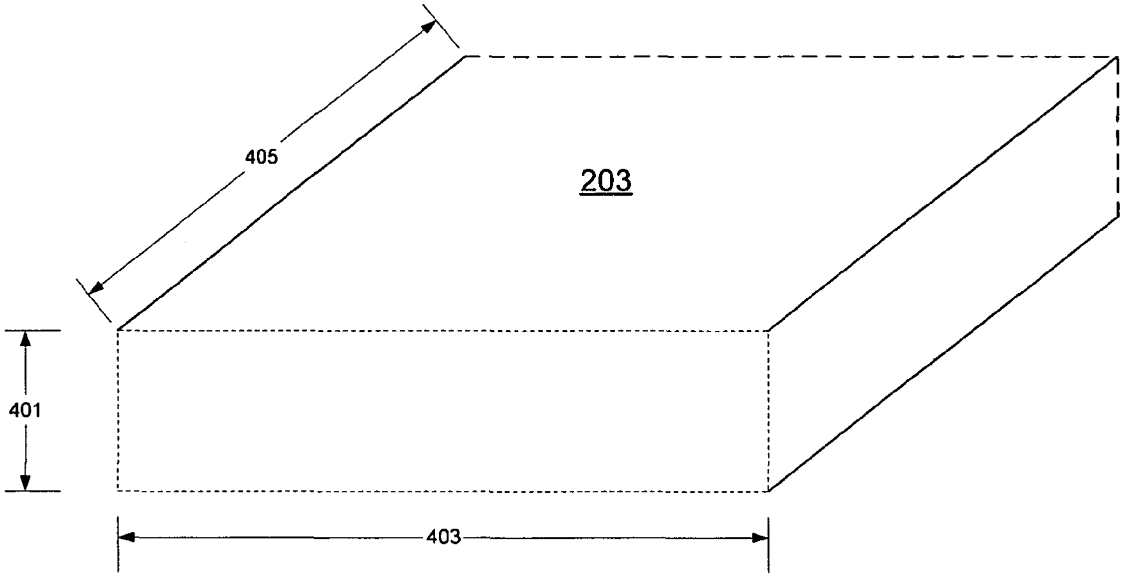
FIG. 4 illustrates a cross section of the mounting strips; according to an embodiment.

FIG. 4 illustrates a cross section of the mounting strips 203. The microphone support 103 may be tuned by varying characteristics of the microphone support 103 (e.g., the mass of the central mass 201, the length, material, and shape of the mounting strips 203, etc.). For example, longer or thicker mounting strips 203 may isolate lower frequencies (i.e., result in a lower support tuning cutoff frequency 301). While longer mounting strips 203 (i.e., along dimension 405) may isolate lower frequencies, if the mounting strips 203 are too long, the microphone (i.e., and central mass) may begin to sag too much in the enclosure. If the mounting strips 203 are too thin (i.e., along dimension 403), the mounting strips 203 may have problems with twisting. Stiffer materials (e.g., stiffer plastics) for the mounting strips 203 may isolate higher frequencies.

FIG. 5 illustrates a mounted microphone 505 in a microphone support 103 in a speakerphone enclosure 100. Holes 507 above the microphone 505 may allow sound through the speakerphone casing 509. The wires 503 to the microphone may be very thin and flexible (e.g., 32 or 28 gauge wire). A wire 503 may be more flexible with a smaller number of thicker strands than a larger number of thinner strands (usually twisted around each other). Other wire sizes and configurations are also contemplated. The wires 503 may be coupled to the microphone 505 through solder 579. Other connection types are also contemplated (e.g., welds). In some embodiments, the wire 503 may not be twisted. The small, flexible wire 503 may reduce frequency propagation down the wire 503 to the microphone 505. Further, wire retention slots 213 may anchor the wires 503 to prevent frequencies from passing along the length of wire 503. For example, vibrations may pass from the enclosure to the wire 503 at the point the wire 503 is coupled to circuitry connected to the speakerphone. The wire retention slots 213 may clamp the vibrations before they arrive at the microphone 505. Vibrations may form along length of wire 511, but these vibrations may be insignificant compared to the vibrations clamped by the retention slots 213. In some embodiments, the wire 503 may fit in the wire retention slots 213 through a friction fit and/or adhesive. Other coupling mechanisms are also contemplated. For example, the wires 503 may be clamped by wire retention slots 213 coupled to the speakerphone enclosure (e.g., extending from a top plate of the speakerphone enclosure). In some embodiments, the mounting strips 203 may be lengthened to clamp the frequencies on the wire 511 even further from the microphone to further lower the resonance frequency of the wire 511 between the wire retention slot 213 and the microphone.

In some embodiments, the majority thickness 551 of the speakerphone enclosure may be less than the thickness 553 of the speakerphone enclosure over the microphones 505. This change in thickness may result in a microphone chamber 501 over each microphone 505. The chamber dimensions may be constructed to minimize the helmholtz resonator frequency. For example, the slant 555 of the chamber wall, the distance 557 of the microphone 505 from the enclosure, etc. may be designed for a specific helmholtz resonator frequency which is inversely proportional to the square root of the cavity volume (V), the inverse square root of the length of the cavity outlet (1), and the square root of the area of the cavity opening (A). The helmholtz resonator frequency frequency $F_H=(v/(2/\pi))$*square root (A/(V1)). The corners 575 of the microphone support 103 and corners 577*a-b* of the chamber 501 may be rounded to further lower the helmholtz resonator frequency. Holes 507 may be adjusted to further reduce helmholtz resonator frequency (e.g., they may be made bigger).

Figure 6:
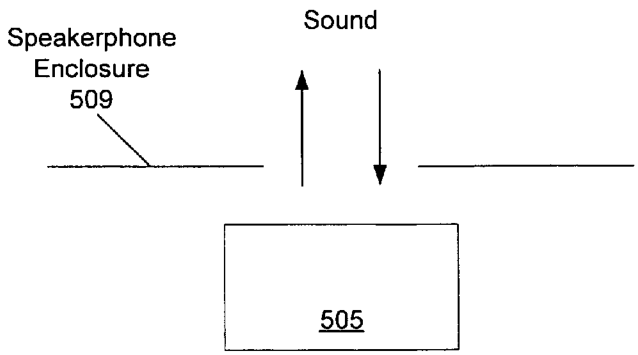
FIG. 6 illustrates sound interaction with a flat mounted microphone, according to an embodiment.

FIG. 6 illustrates sound interaction with a flat mounted microphone, according to an embodiment. The sound reflected off of the microphone diaphragm through the hole in the speakerphone enclosure effectively doubles the pressure on the diaphragm. This boundary layer microphone effect may also improve audio reception. The microphones will also be more sensitive to sound waves approaching the top of the speakerphone.

Figure 7:
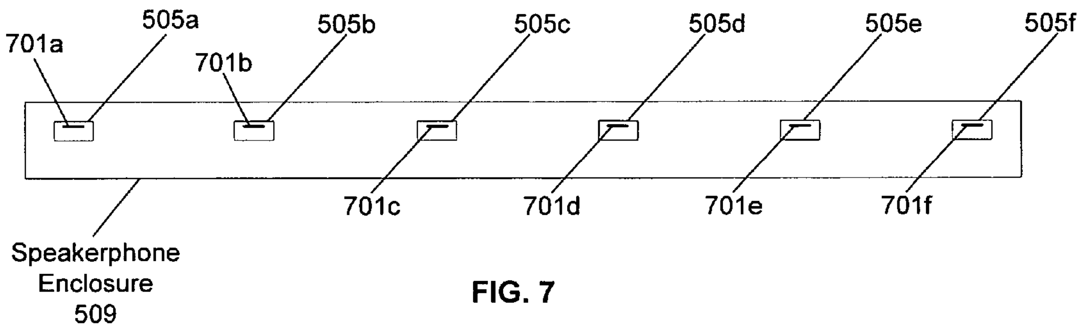
FIG. 7 illustrates a side profile of the speakerphone, according to an embodiment.

FIG. 7 illustrates a side profile of the speakerphone, according to an embodiment. The microphones 505*a-f* may be mounted close to a table surface to reduce sound echoes off of the table interfering with the microphones 503. Sound echos from the table (or surface the speakerphone is resting on may cause nulls. The lower the microphones are to the table, the higher the frequencies these nulls occur in and therefore, the less of a problem they may be to the speakerphone. FIG. 7 also illustrates microphone diaphragms 701*a-f* which are substantially parallel to the top surface of the speakerphone enclosure 509, according to an embodiment.

Figure 8A:
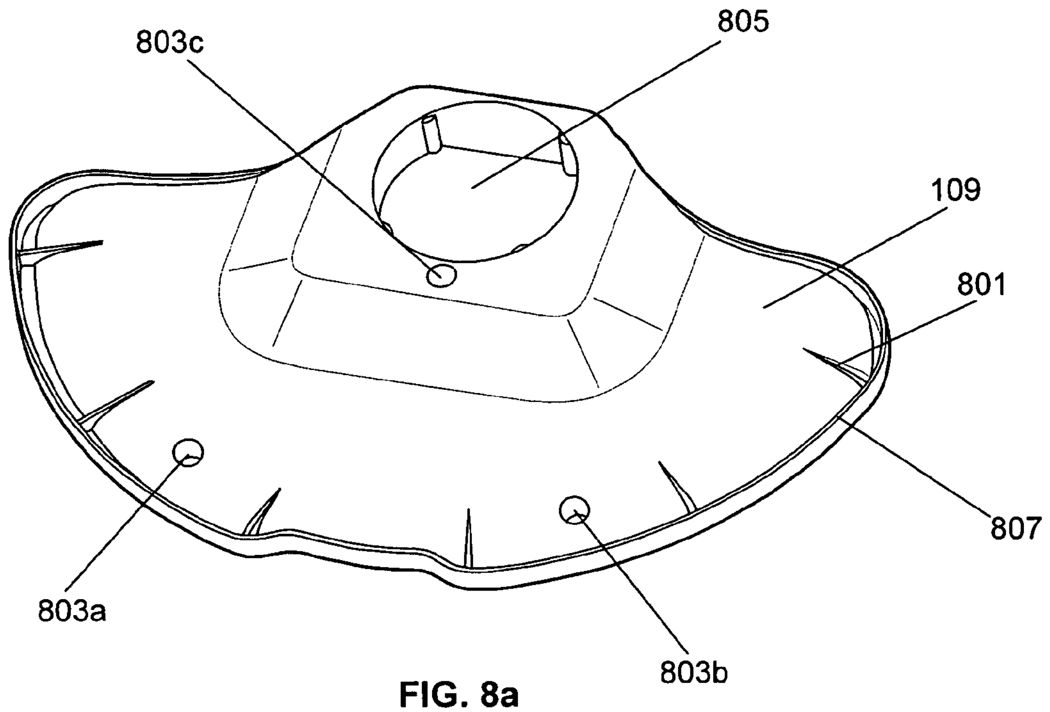
FIG. 8*a* illustrates a speaker enclosure for the central speaker, according to an embodiment.
Figure 9A:
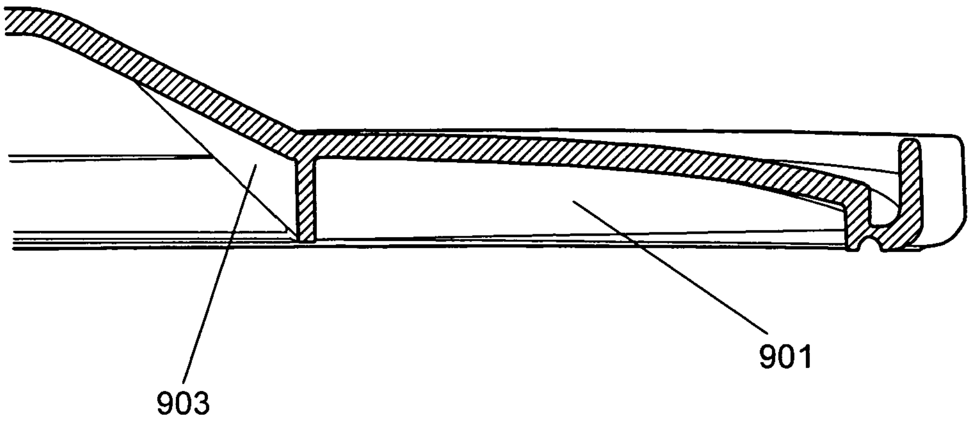
FIGS. 9*a-b* illustrate cross sections of the speaker enclosure, according to embodiments.
Figure 9B:
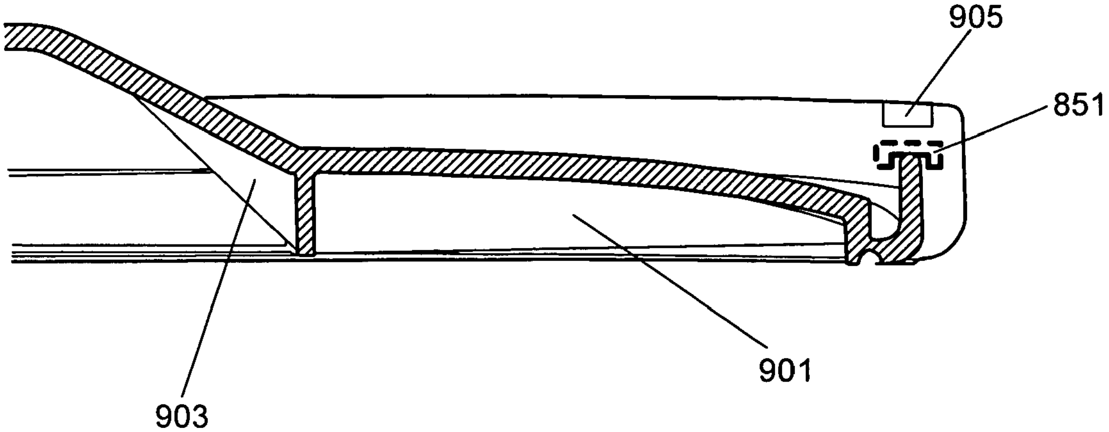

FIG. 8*a* illustrates a speaker enclosure 109 for the central speaker, according to an embodiment. The speaker enclosure 109 may be made of a stiff, heavy material (e.g., a dense plastic) to prevent the speaker vibrations from excessively vibrating the speakerphone enclosure (which may affect the microphones). The speaker enclosure 109 may be solid or filled with a heavy/dense material (e.g., glass). The interior of the speaker enclosure 109 may also have ribs 901 (as seen in FIGS. 9*a-b*) for increased stiffness. The speaker enclosure 109 may include a raised rim 807 and ridges 801 for increased stiffness. The raised rim 807 and ridges 801 may increase the stiffness of the enclosure by approximately three times (other multiples are also possible) over enclosures of the same size without a raised rim and ridges. Mounting holes 803*a-c* may be used to mount the speaker enclosure 109 to the interior of the speakerphone 100. The speaker may sit inside aperture 805. The speaker may be coupled to the speaker enclosure through a friction fit, adhesive, mounting screws, etc.

Figure 8B:
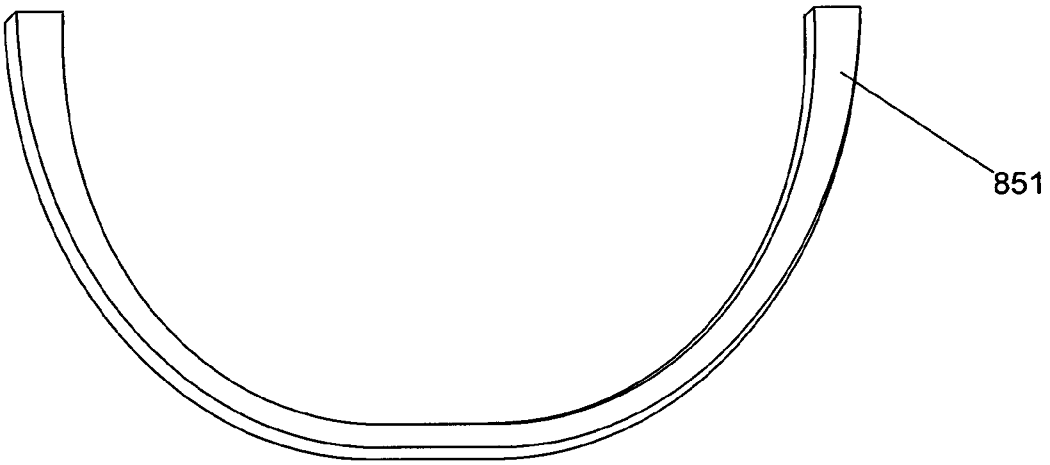
FIG. 8*b* illustrates a foam rim that may be placed on top of a ridge on the speaker enclosure, according to an embodiment.

FIG. 8*b* illustrates an embodiment of a foam rim 851 that may be placed on top of ridge 801 (below microphones mounted to the top plate of the speakerphone enclosure). The foam rim may further acoustically isolate the microphones from the speaker enclosure.

Figure 10:
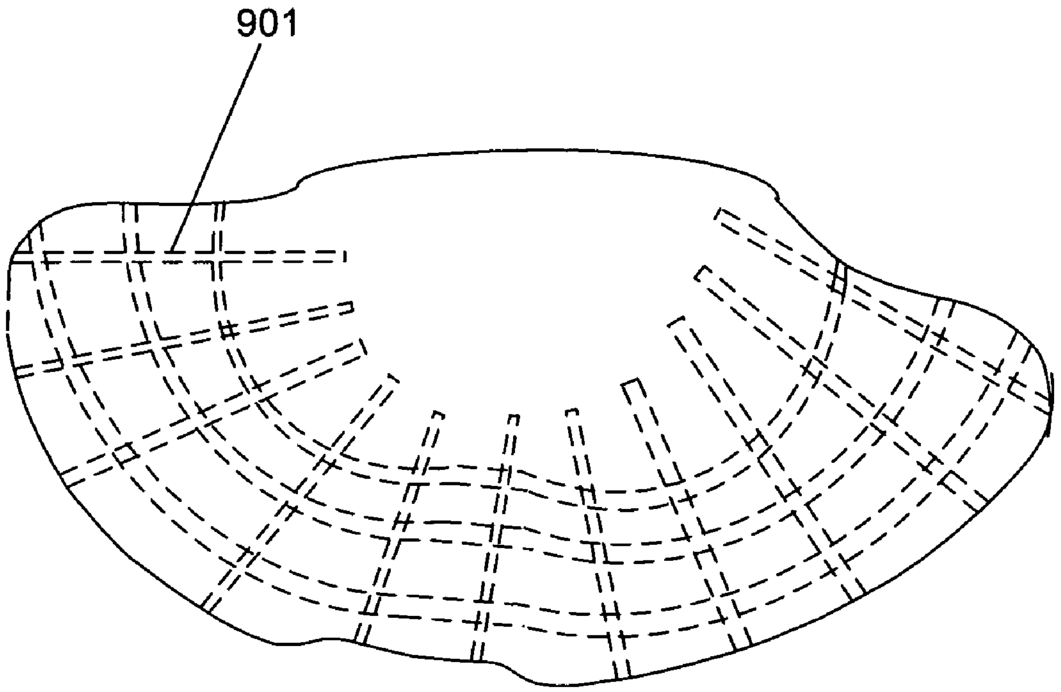
FIG. 10 illustrates a ribbing footprint for the speaker enclosure, according to an embodiment.

FIGS. 9*a-b* illustrates a cross section of the speaker enclosure 109, according to an embodiment. Ribs 901 and 903 may be used inside the speaker enclosure 109 to add stiffness to the speaker enclosure. The strength of the ribs may be proportional to the cube of the height of the ribs. In some embodiments, the ribs may be placed closer together with shorter heights than further apart with greater heights for increased stiffness. FIG. 10 illustrates a ribbing footprint for the speaker enclosure, according to an embodiment. Other footprints are also contemplated.

Figure 11:
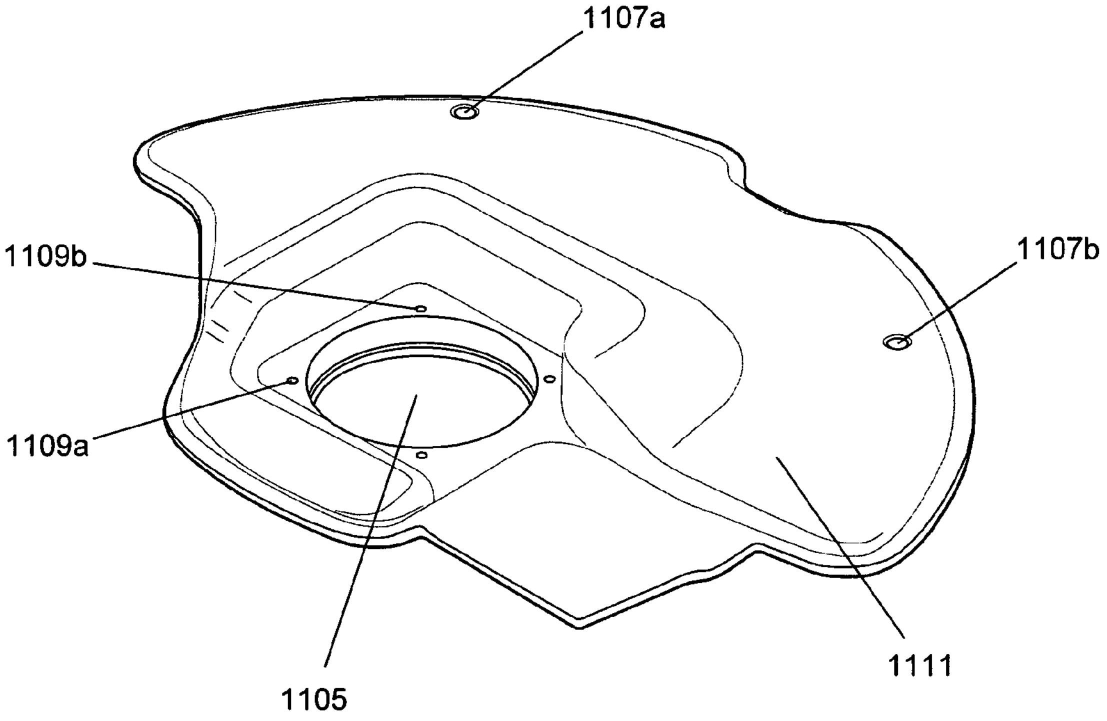
FIG. 11 illustrates a second embodiment of a speaker enclosure, according to an embodiment.

FIG. 11 illustrates a second embodiment of a speaker enclosure, according to an embodiment. In some embodiments, the speaker enclosure may not have a depressed central speaker holder slot 1105. The interior may be solid (e.g., filled with dense glass) and may include internal ridges (with a similar footprint as FIG. 10). Other materials and footprints are also contemplated. The speaker enclosure 1111 may be mounted to the interior of the speakerphone through one or more mounting holes 1107*a-b* (e.g., with fasteners such as screws or rivets). Other mounting mechanisms are also contemplated. The speaker may be mounted to the speaker enclosure 1111 through enclosure holes 1109 (e.g., holes 1109*a-b*).

Figure 12A:
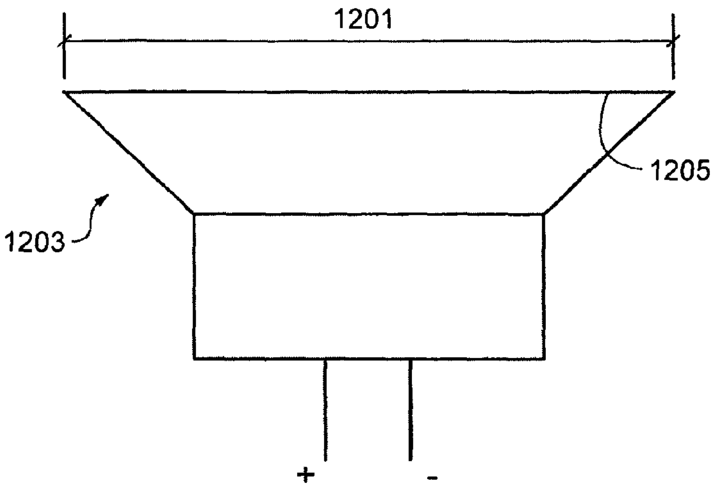
FIGS. 12*a-c* illustrate embodiments of the speaker casing and diaphragm, according to an embodiment.
Figure 12B:
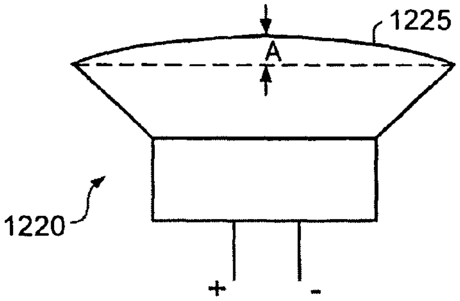
Figure 12C:
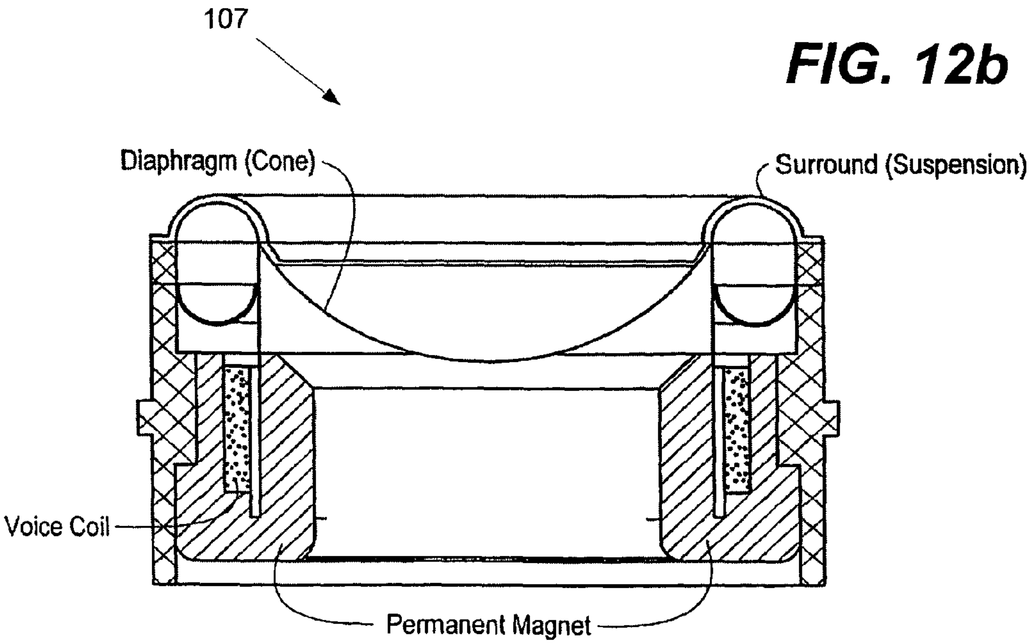

FIGS. 12*a-c* illustrate embodiments of the speaker casing 1201 and diaphragm 1205. The speaker 107 may use a long-throw transducer 1225 to achieve a large excursion. The speaker diaphragm may be a curved surface (such as a portion of a paraboloid, or, a portion of a sphere or oblate sphere, a truncated cone, etc.). The speaker 107 may be driven from its perimeter instead of from its base. The speaker 107 may be a 2" diameter speaker (other speaker sizes are also contemplated). Because of the larger excursion, the speaker 107 may achieve air displacement equivalent to much larger diameter speakers (such as speakers with diameters in the range of 3" to 3.5"). Furthermore, because the speaker has a smaller diameter, the radiation pattern of the speaker may be broader (i.e., more omni-directional) than the larger diameter speakers. This broader radiation pattern may be due to the smaller speaker aperture and/or the "stiffer" diaphragm being less likely to "break up" (i.e., move in higher-order vibrational modes). These higher-order vibrational modes may create standing waves along the surface of the diaphragm, which can act to increase distortion and also to increase the directionality (i.e., to make it more directional), because of the frequency-dependent nulls in the radiation pattern that are created as one part of the diaphragm vibrates in a different manner than other parts of the same diaphragm. In some embodiments, the perimeter driven, stiffer speaker may require more energy to drive than center driven speakers, but the advantages of less distortion (especially at human voice frequencies of 100 Hz-6 kHz and other higher frequencies) may outweigh the increase in needed energy. For example, the perimeter driven speaker may have less than 4% distortion at maximum sound pressure level (SPL).

Figure 13A:
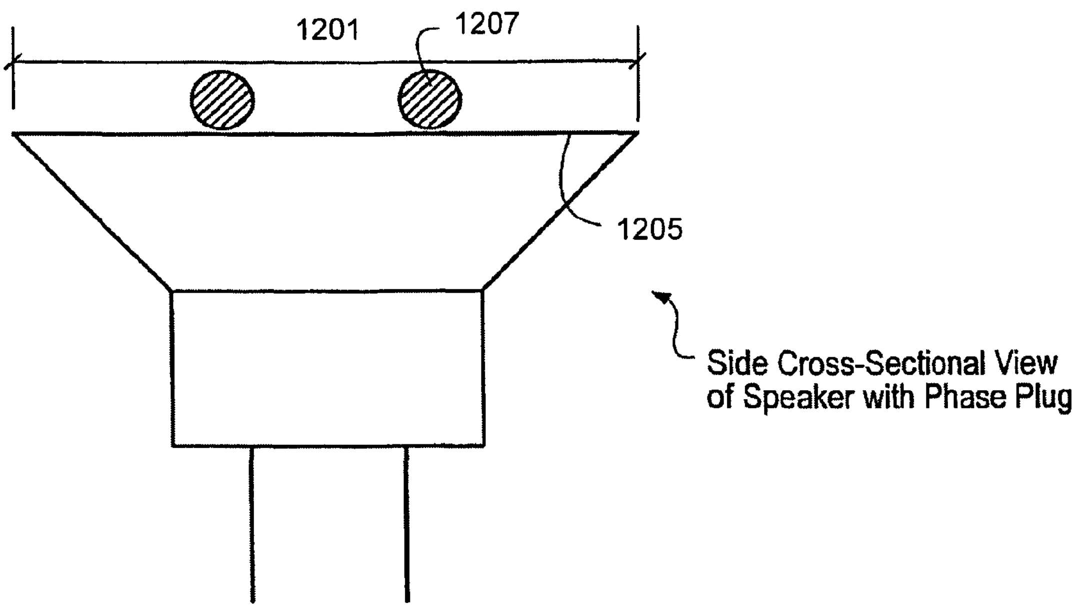
FIGS. 13*a-b* illustrate an embodiment of a phase plug for the speaker, according to an embodiment.
Figure 13B:
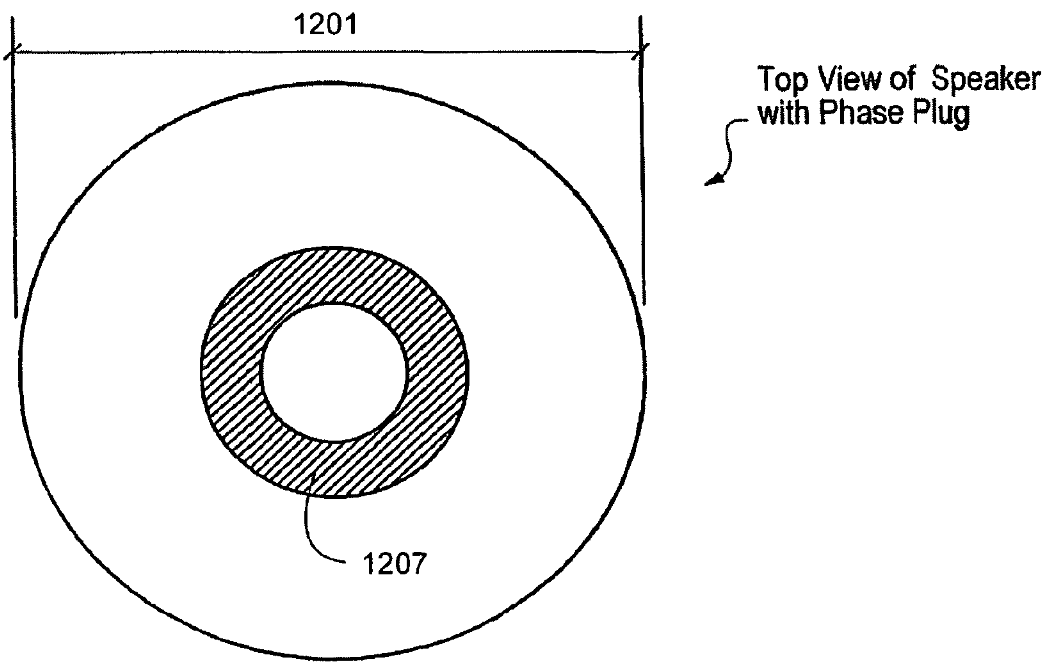

FIGS. 13*a-b* illustrate an embodiment of a phase plug 1207 for the speaker 107. In some embodiments, a speaker 107 may be configured with a phase plug 1207. The phase plug 1207 may be shaped like a circular ring. The phase plug 1207 may be suspended above the diaphragm of the speaker 107 at a distance sufficient to ensure that the diaphragm does not contact the phase plug even at maximum excursion. The phase plug 1207 serves to diffract sound coming out of the speaker 107. For example, the phase plug 1207 may diffract high frequencies at acute angles (i.e., at angles less than 90 degrees) relative to the central axis of the speaker 107.

In various embodiments, the diffraction of the high frequencies induced by the phase plug 1207 may make the speaker's transmission pattern less narrowly focused at high frequencies. The phase plug 1207 may be circular in the side cross-section of FIG. 12*b*. However, the phase plug 1207 may have other non-circular cross-sections. For example, the phase plug 1207 may have a rectangular cross-section. The speaker may be configured with a smaller diameter, a larger excursion, and a phase plug 1207 by combining the teachings of the above described embodiments.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A speakerphone, comprising:

an enclosure comprising a top plate and a bottom plate, wherein the bottom plate supports the speakerphone;

at least three microphones, wherein each microphone comprises a diaphragm having a surface to receive sound;

wherein the at least three microphones are mounted vertically in the enclosure to the top plate by respective microphone supports with the respective surfaces of the diaphragms of the microphones substantially parallel to a bottom surface of the bottom plate, wherein the at least three microphones are acoustically isolated from the bottom plate by a first material located between the bottom plate and the at least three microphones.

2. The speakerphone of claim 1, wherein the at least three microphones are mounted in a circular array.

3. The speakerphone of claim 1, further comprising a speaker, wherein the speaker is mounted to the speakerphone in a speaker enclosure.

4. The speakerphone of claim 3, wherein an interior of the speaker enclosure is comprised of a dense material.

5. The speakerphone of claim 3, wherein an interior of the speaker enclosure includes at least one ridge to increase stiffness of the speaker enclosure.

6. The speakerphone of claim 3, wherein the speaker enclosure includes a raised rim along an edge of the speaker enclosure to increase stiffness of the speaker enclosure.

7. The speakerphone of claim 6, wherein the first material comprises a foam rim placed on top of the raised rim, wherein the microphones are above the foam rim and are cushioned from the raised rim by the foam rim.

8. The speakerphone of claim 3, wherein the speaker has a perimeter driven diaphragm.

9. The speakerphone of claim 3, further comprising a phase plug coupled to the speaker.

10. The speakerphone of claim 1, wherein the enclosure further comprises at least one hole positioned above each of the at least three microphones.

11. The speakerphone of claim 1, wherein the at least three microphones comprise at least 8 microphones in a circular array around a central speaker.

12. The speakerphone of claim 1, wherein each microphone support comprises:

a central mass that receives the respective microphone;

a mounting strip that suspends the central mass; and a mounting bracket coupled to the mounting strip, wherein the mounting bracket is mounted to the top plate.

13. A speakerphone, comprising:

an enclosure comprising a top plate and a bottom plate, wherein the bottom plate supports the speakerphone;

at least three microphones, wherein each microphone comprises a diaphragm having a surface to receive sound, wherein the at least three microphones are mounted vertically in the enclosure to the top plate by respective microphone supports with the respective surfaces of the diaphragms of the microphones substantially parallel to a bottom surface of the bottom plate, wherein the at least three microphones are acoustically isolated from the bottom plate by a first material located between the bottom plate and the at least three microphones;

a speaker mounted to the enclosure;

a speaker enclosure mounted to the enclosure and the speaker;

wherein the at least three microphones are mounted in a circular array around the speaker.

14. The speakerphone of claim 13, wherein an interior of the speaker enclosure includes at least one ridge to increase stiffness of the speaker enclosure.

15. The speakerphone of claim 13, wherein the speaker enclosure includes a raised rim along an edge of the speaker enclosure to increase stiffness of the speaker enclosure.

16. The speakerphone of claim 15, wherein the first material comprises a foam rim placed on top of the raised rim, wherein the microphones are above the foam rim and are cushioned from the raised rim by the foam rim.

17. The speakerphone of claim 13, wherein each microphone support comprises:

a central mass that receives the respective microphone;

a mounting strip that suspends the central mass; and a mounting bracket coupled to the mounting strip, wherein the mounting bracket is mounted to the top plate.

* * * * *